(12) United States Patent
Kim et al.

(10) Patent No.: US 6,784,133 B2
(45) Date of Patent: Aug. 31, 2004

(54) METHOD FOR PREPARING CATALYST FOR OLEFIN POLYMERIZATION

(75) Inventors: Il Seop Kim, Taejeon (KR); Moon Young Shin, Taejeon (KR); Ki Su Ro, Taejeon (KR)

(73) Assignee: Samsung Atofina Co. Ltd., Seosan-si (KR)

( * ) Notice: Subject to any disclaimer, the term of this patent is extended or adjusted under 35 U.S.C. 154(b) by 0 days.

(21) Appl. No.: 10/250,530

(22) PCT Filed: Dec. 28, 2001

(86) PCT No.: PCT/KR01/02284

§ 371 (c)(1),
(2), (4) Date: Jun. 30, 2003

(87) PCT Pub. No.: WO02/053604

PCT Pub. Date: Jul. 11, 2002

(65) Prior Publication Data

US 2004/0063572 A1 Apr. 1, 2004

(30) Foreign Application Priority Data

Dec. 29, 2000 (KR) ........................................ 2000-85531

(51) Int. Cl.$^7$ .................................................. C08F 4/64
(52) U.S. Cl. ........................ 502/116; 502/116; 502/121; 502/126; 526/124.8; 526/124.9
(58) Field of Search ................................. 502/116, 121, 502/126

(56) References Cited

U.S. PATENT DOCUMENTS

| | | |
|---|---|---|
| 3,953,414 A | 4/1976 | Galli et al. |
| 4,071,674 A | 1/1978 | Kashiwa et al. |
| 4,158,642 A | 6/1979 | Langer, Jr. |
| 4,315,874 A | 2/1982 | Ushida et al. |
| 4,330,649 A | 5/1982 | Kioka et al. |
| 4,347,158 A | 8/1982 | Kaus et al. |
| 4,399,054 A | 8/1983 | Ferraris et al. |
| 4,425,257 A | 1/1984 | Miro et al. |
| 4,477,639 A | 10/1984 | Nielsen |
| 4,482,687 A | 11/1984 | Noshay et al. |
| 4,618,661 A | 10/1986 | Kaus et al. |
| 4,680,381 A | 7/1987 | Asada et al. |
| 4,952,649 A | 8/1990 | Kioka et al. |
| 5,106,807 A | 4/1992 | Morini et al. |
| 5,221,651 A | 6/1993 | Sacchetti et al. |

FOREIGN PATENT DOCUMENTS

| | | |
|---|---|---|
| JP | 58-83006 | 5/1983 |
| JP | 07-238114 A | 9/1995 |
| WO | WO 91/17190 | 11/1991 |

Primary Examiner—Caixia Lu
(74) Attorney, Agent, or Firm—Paul T. Clark; Clark & Elbing LLP

(57) ABSTRACT

Disclosed is a preparation method of titanium catalyst for olefin polymerization, the method comprising (1) preparing magnesium compound solution by resolving non-deoxidative magnesium halide and IIIA group atom compound in a solvent mixture of cyclic ether, at least one alcohol, phosphorus compound and organosilane with or without hydrocarbon solvent; (2) reacting said magnesium compound solution with titanium compound, silicon compound, tin compound or mixture thereof to produce a support; and (3) reacting said support with titanium compound and electron donor to produce solid complex titanium catalyst, wherein the particle size and particle size distribution f said catalyst are regulated by controlling solubility of the reactants in said steps (2) and/or (3).

13 Claims, No Drawings

METHOD FOR PREPARING CATALYST FOR OLEFIN POLYMERIZATION

CROSS REFERENCE TO RELATED APPLICATIONS

This application is the U.S. National Stage of International Application No. PCT/KR01/02284, filed Dec. 28, 2001, published in English, which claims benefit of Korean application 2000/85531, filed Dec. 29, 2000, each hereby incorporated by reference.

TECHNICAL FIELD

The present invention relates to a method of preparing a catalyst for α-olefin polymerization, more particularly, a method of preparing a solid titanium catalyst, the particle size of which can be easily controlled and which is supported by a magnesium-containing supporter.

BACKGROUND ART

Until now, many catalysts for olefin polymerization and the polymerization processes for which they are used have been reported. However, in order to improve the physical properties of a produced polymers, or to produce a polymer having special physical properties, development of novel catalysts is urgent.

Magnesium-containing catalysts for olefin polymerization are suitable for gaseous phase polymerization methods and have high catalyst activity and provide polymers of excellent stereoregularity. In catalysts for gaseous phase polymerization methods, catalyst activity and stereoregularity are important in order to reduce cost. In addition, shape, size, size distribution of catalyst particle, etc. are important. To satisfy catalyst activity and stereoregularity in α-olefin polymerization, several studies have been conducted. Thanks to these studies, the elimination of catalyst residue and atactic composition is not required in most of the present, commercial preparation processes of polyolefin, particularly, polypropylene.

However, nowadays, polypropylene having more improved physical properties, particularly stereoregularity is needed. To obtain these polypropylenes, a novel catalyst is needed.

The mean size of a catalyst particle must also be considered. For example, to produce an impact resistant copolymer having a high content ratio of ethylene to propylene, in which the mean particle size is about 1000 µm, a catalyst with a mean particle size of about 30 µm to about 55 µm is required.

With respect to the size distribution of a catalyst particle, a catalyst having a small particle size is problematic for catalyst transfer, while a catalyst with a large particle size is problematic due to the formation of lumps of polymer during polymerization. Thus, a catalyst having a narrow particle size distribution is required.

Furthermore, a catalyst must have excellent resistance against abrasion generated during the polymerization process and must have a sufficiently high bulk density.

Thus, a polymerization catalyst that can be easily prepared and that has an easily controllable particle size is urgently required.

Many catalysts that are based on magnesium-containing titanium for olefin polymerization and many preparation methods thereof have been reported. In particular, many preparation methods have been reported for olefin polymerization catalysts where a magnesium solution is used and in which the particle size is easily controlled. In the presence of hydrocarbon solvent, magnesium compound is reacted with electron donors such as alcohols, amines, cyclic ethers, carboxy oxides, etc. to provide magnesium solution.

Alcohol is used as an electron donor in U.S. Pat. Nos. 4,330,649, 5,106,807 and Japanese Laid-Open Publication No. SHO 58-83006. Preparation methods of magnesium solutions are reported in U.S. Pat. Nos. 4,315,874, 4,399,054 and 4,071,674.

Tetrahydrofuran is a cyclic ether that has been diversely used as magnesium chloride compound (for example, U.S. Pat. No. 4,482,687), as an additive of cocatalyst (U.S. Pat. No. 4,158,642), and as a solvent (U.S. Pat. No. 4,477,639), etc.

U.S. Pat. Nos. 4,347,158, 4,422,957, 4,425,257, 4,618,661 and 4,680,381 disclose preparation methods of catalysts, comprising: (1) adding Lewis acids, such as aluminum chloride, to a supporter, that is, magnesium chloride to provide a mixture and (2) grinding the mixture.

In the aforementioned inventions, high catalyst activity was achieved. However, uniformity in shape and size, narrowness of size distribution, etc. of catalyst particle and excellent stereoregularity were not achieved.

As described in the above, a novel catalyst for olefin polymerization, which can be simply prepared and which has high polymerization activity, large mean particle size, and narrow particle size distribution, the size of which can be regulated, and thus, can be used to provide highly stereoregular polymer is urgently required.

DISCLOSURE OF THE INVENTION

A feature of the present invention is to provide simpler preparation methods of novel catalysts for olefin polymerization. By controlling the solubility of the reactants, the methods produce catalysts having improved activity and narrow particle size distribution. In addition, polymers prepared using the catalysts have more improved stereoregularity.

In accordance with the feature of the present invention, there is provided a preparation method of titanium catalyst for olefin polymerization, comprising (1) preparing magnesium compound solution by dissolving magnesium halide having no reducing ability and IIIA group element compound in a solvent mixture of cyclic ether, at least one alcohol, phosphorus compound and organosilane with or without hydrocarbon solvent; (2) reacting said magnesium compound solution with titanium compound, silicon compound, tin compound or mixture thereof to produce a supporter; and (3) reacting said supporter with titanium compound and electron donor to produce solid complex titanium catalyst, wherein the particle size and particle size distribution of said catalyst are regulated by controlling solubility of the reactants in said steps (2) and/or (3).

Examples of the magnesium halide compounds having no reducing ability are halogenated magnesium, alkylmagnesium halide, alkoxymagnesium halide, aryloxymagnesium halide and the like. These magnesium halide compounds may be effectively used as mixtures of two or more or in complex with other metals.

Examples of IIIA group element compounds, which are used in combination of magnesium halide compounds in the preparation of magnesium compound solution, are boron halide such as boron fluoride, boron chloride and boron bromide; aluminum halide such as aluminum fluoride, aluminum bromide, aluminum chloride and aluminum iodide. The preferred IIIA group element compound is an aluminum halide, most preferably aluminum chloride. The preferred molar ratio of IIIA group element compound to magnesium compound is 0.25 or less. If the ratio exceeds 0.25, the resultant catalyst is of variable size and reduced activity.

Examples of the hydrocarbon solvents which can be used in the preparation of magnesium compound solution include aliphatic hydrocarbons such as pentane, hexane, heptane, octane, decane and kerosene; alicyclic hydrocarbons such as cyclopentane, methyl cyclopentane, cyclohexane, methylcyclohexane; aromatic hydrocarbons such as benzene, toluene, xylene and ethylbenzene; and halogenated hydrocarbons such as trichloroethylene, carbon tetrachloride and chlorobenzene.

To make magnesium halide compound from magnesium solution, as described in the above, a solvent mixture of cyclic ether, at least one alcohol, phosphorus compound and organosilane is used in the presence or absence of hydrocarbon solvent.

Examples of cyclic ethers which can be used in the preparation of magnesium solution according to the present invention include $C_{2-15}$ cyclic ethers such as tetrahydrofuran, 2-methyl tetrahydrofuran and tetrahydropyran. Preferred example of cyclic ether is tetrahydrofuran. If cyclic ether having carbon atom higher than 15 is used, it is difficult to prepare magnesium solution.

Examples of alcohols which can be used in the preparation of magnesium solution according to the present invention include $C_{1-20}$ alcohols such as methanol, ethanol, propanol, butanol, pentanol, hexanol, octanol, decanol, dodecanol, octadecylalcohol, benzylalcohol, phenylethylalcohol, isopropylbenzylalcohol, and cumylalcohol. Preferred examples of alcohols are $C_{1-12}$ alcohols. If alcohols having carbon atom higher than 20 is used, it is difficult to prepare magnesium solution.

Mean size and size distribution of catalyst particle which is prepared differ depending upon the ratio of alcohol to cyclic ether, etc. However, to obtain spherical catalyst having particle size of about 50 μm, the total sum of alcohol and cyclic ether must be about 0.5 moles to about 20 moles, preferably about 1.0 mole to about 20 moles, more preferably about 2.0 moles to about 10 moles per 1 mole of magnesium compound in preparation of said magnesium solution.

If the total sum of alcohol and cyclic ether is less than 0.5 mole per 1 mole of magnesium compound in the said step, it is difficult to prepare magnesium solution. If the total sum of alcohol and cyclic ether is more than 20 moles per mole of magnesium compound in the said step, size of catalyst particle is reduced.

Furthermore, alcohol must be used in an amount of 0.05 mole to 0.95 mole per 1 mole of cyclic ether. If alcohol is less than 0.05 mole per 1 mole of cyclic ether, it is difficult to prepare spherical catalyst. If alcohol is more than 0.95 mole per 1 mole of cyclic ether, the catalyst activity of the resultant catalyst is reduced.

At this moment, as said alcohols, mixed alcohols of $C_{1-3}$ alcohol having relatively low molecular weight and $C_{4-20}$ alcohol having relatively high molecular weight is preferable.

Alcohol having relatively low molecular weight must be used in-an amount of 1 mole % to 40 mole %, preferably 1 mole % to 25 mole % based on the total alcohols.

If alcohol having relatively low molecular weight is used in an amount less than 1 mole %, the catalyst activity of the resultant catalyst is reduced. If alcohol having relatively low molecular weight is used in an amount more than 25 mole %, it is difficult to prepare spherical catalyst.

The preferred example of alcohol having relatively low molecular weight is methanol or ethanol, and the preferred example of alcohol having relatively high molecular weight is butanol, isoamyl alcohol or 2-ethylhexanol.

At least one alcohol employed in the present invention, partly or totally, can be used in order to dissolve magnesium compound. Alternatively, firstly, magnesium solution is prepared by dissolving magnesium compound. Secondly, at least one alcohol employed in the present invention, partly or totally, is added thereto.

However, in (2) supporter preparation step, when magnesium solution reacts with transition metal compound to provide solid particles, the total amount of the aforementioned at least one alcohol must be kept constant.

Phosphorus compounds used to prepare the magnesium solution are represented by the following Formula(1):

$$PX_aR_b^1(OR^2)_c \text{ or } POX_dR_e^3(OR^4)_f \qquad (1)$$

wherein X is a halogen atom;
each of $R^1$, $R^2$, $R^3$ and $R^4$ is independently $C_{1-20}$ alkyl, alkenyl or aryl;
each of a, b and c is independently an integer of 0–3, provided that a+b+c=3; and
each of d, e and f is independently an integer of 0–3, provided that d+e+f=3.

Examples of phosphorus compounds which can be used in the preparation of magnesium solution according to the present invention include trichlorophosphine, tribromophosphine, diethylchlorophosphite, diphenylchlorophosphite, diethylbromophosphite, diphenylbromophosphite, methyldichlorophosphite, phenyldichlorophosphite, trimethylphosphite, triethylphosphite, trinormalbutylphosphite, trioctylphosphite, tridecylphosphite, triphenylphosphite, phosphorus oxychloride, triethylphosphate, trinormalbutylphosphate, triphenylphosphate and the like. Any other phosphorus compound to satisfy the above Formula (1) is also available. A phosphorus compound may be used in an amount of 0.01 mole to 0.25 mole, preferably 0.05 mole to 0.2 mole per 1 mole of magnesium compound. If the used amount is less than 0.01 mole per 1 mole of magnesium compound, polymerization activity of catalyst is reduced. If the used amount is more than 0.25 mole per 1 mole of magnesium compound, it is difficult to prepare spherical catalyst.

Organosilanes used to prepare magnesium solution are represented by the following Formula(2):

$$R_nSiR_{4-n} \qquad (2)$$

wherein R is a hydrogen atom, $C_{1-10}$ alkyl, alkoxy, haloalkyl or aryl, or C1-8 halosilylalkyl group;
R' is halo, $C_{1-10}$ alkoxy, haloalkoxy or aryloxy, or $C_{1-8}$ halosilylalkoxy; and
n is an integer of 0–4.

Examples of Organosilanes to satisfy the above Formula (2) include trimethylchlorosilane, trimethylethoxysilane, dimethylchlorosilane, tetraethoxysilane, tetrabutoxysilane, etc.

An organosilane is used as a size-controlling agent in the present invention. It can prevent the production of particles that are too small.

The organosilane is used in an amount of 0.01 mole to 0.25 mole, preferably 0.05 mole to 0.2 mole per 1 mole of magnesium compound. If organosilane is less than 0.01 mole per 1 mole of magnesium compound, the organosilane cannot make its role as a size-controlling agent. If organosilane is more than 0.25 mole per 1 mole of magnesium compound, it is difficult to prepare catalyst particle having the size desired in the present invention.

In order to prepare magnesium solution, it is preferable that magnesium compound is reacted with a solvent mixture of cyclic ether, alcohol, phosphorus compound and organosilane in hydrocarbon medium.

Reaction temperature differs depending upon the species and the amount of cyclic ether, alcohol, phosphorus compound and organosilane. However, reaction can be carried out well at temperature of at least about −25° C. to about 200° C., preferably about −10° C. to about 200° C., more preferably about 0° C. to about 150° C. for about 1 hr to about 20 hrs, preferably about 5 hrs to about 10 hrs.

The magnesium compound solution prepared in aforementioned manner is reacted with transition metal compound, specifically titanium compound, silicon compound, tin compound or mixture thereof to provide a supporter.

An titanium compound which is used in the aforementioned supporter preparation step is in the liquid state and is represented by the following Formula(3):

$$\text{Ti(OR)}_a X_{4-a} \quad (3)$$

wherein R is a $C_{1-10}$ alkyl group;
X is a halogen atom; and
a is an integer of 0–4.

Using this titanium compound renders the size of catalyst particle constant and large, distribution of particle size narrow.

The examples of titanium compounds to satisfy the above Formula (3) include tetrahalogenated titanium such as $TiCl_4$, $TiBr_4$ and $TiI_4$; trihalogenatedalkoxy titanium such as $Ti(OCH_3)Cl_3$, $Ti(OC_2H_5)Cl_3$ and $Ti(OC_2H_5)Br_3$; dihalogenatedalkoxy titanium such as $Ti(O(i-C_4H_9))_2Cl_2$ and tetraalkoxy titanium such as $Ti(OC_2H_5)_2Br_2$; $Ti(OCH_3)_4$, $Ti(OC_2H_5)_4$ and $Ti(OC_4H_9)_4$. These compounds can be used singly or in combination. Preferably titanium compounds containing halogen atoms, more preferably $TiCl_4$ is used.

The examples of said silicon compound include silicon tetrahalide, silicon alkylhalide and the like. The examples of said tin compounds include tin tetrahalide, tin alkylhalide, tin hydrohalide and the like.

Titanium compound, silicon compound, tin compound, or mixture thereof, employed in order to precipitate magnesium compound solution is used in an amount of about 0.1 to about 200 moles, preferably about 0.1 to about 100 moles, more preferably about 0.2 to about 80 moles per 1 mole of magnesium compound.

When magnesium compound solution is reacted with titanium compound, silicon compound, tin compound or mixture thereof, shape, size and size distribution of the precipitated solid particle (supporter) highly depend on reaction condition.

By reacting magnesium compound solution with titanium compound, silicon compound, tin compound or mixture thereof at a sufficiently low temperature, the immediate production of solid product is prevented. Subsequently, by heating the reaction product slowly, solid composition is produced.

The Solubilities of reactants can be regulated by controlling reaction temperature and pressure.

Temperature of contact reaction is preferably between about −70° C. and about 70° C., more preferably between about −50° C. and about 50° C. After the contact reaction, the reaction temperature is slowly elevated to a temperature between about 50° C. and about 150° C., preferably between about 60° C. and about 80° C. Then, the reaction is completely carried out for the time between about 30 minutes and 5 hrs.

Reactor pressure is fixed to a value between about 0 bar and about 2 bar (gauge pressure), preferably between about 0.01 and about 0.5 bar (gauge pressure). By fixing reactor pressure to such a low value, evaporated amount of alcohols which dissolve magnesium halide is controlled. In the result, supporter and catalyst are provided with large size and narrow distribution of size. Additionally, the amount of organosilane used as a size-controlling agent is reduced.

The supporter produced in the aforementioned manner is reacted with titanium compound in the presence of an appropriate electron donor to provide catalyst according to the present invention.

Conventionally, this reaction is comprised of two steps: (1) reacting magnesium supporter with titanium compound, optionally together with an electron donor, and subsequently separating solid composition; and (2) reacting said solid composition with titanium compound and an electron donor once more, separating solid composition, and subsequently drying solid composition.

Alternatively, magnesium supporter is reacted with titanium compound in the presence or absence of hydrocarbon solvent or halogenated hydrocarbon solvent for appropriate hours. And then, an electron donor is introduced thereto and the reaction is carried out.

It is desirable to conduct reaction at a temperature of about 90° C. to about 120° C. and at a gauge pressure of about 0 bar to about 2 bar.

The examples of said titanium compounds include titanium halide, $C_{1-20}$ halogenatedalkoxy titanium, or mixture thereof. Preferably, titanium halide or $C_{1-8}$ halogenatedalkoxy titanium, more preferably, titanium tetrahalide is used.

According to the present invention, titanium catalyst for olefin polymerization having mean particle size of 30 $\mu$m–120 $\mu$m is prepared.

Catalyst prepared according to the present invention, directly or prepolymerized, can be effectively used in polymerizing propylene. Especially, this catalyst is useful in copolymerizing olefins such as ethylene, propylene, 1-butene, 1-pentene, 4-methyl-1-pentene and 1-hexene and copolymerizing monomers having polyunsaturated compounds such as conjugated or unconjugated dienes.

BEST MODE FOR CARRYING OUT THE INVENTION

Now, the preferred embodiments of the present invention will be described in detail by the following Examples without limiting the scope of the invention in any way.

EXAMPLE 1
Preparation of Solid Complex Titanium Catalyst
Solid complex titanium catalyst was prepared through the following 3 steps:
<1 step> Preparation of Magnesium Compound Solution A mixture of 6 Kg of $MgCl_2$, 1364 Kg of $AlCl_3$ and 180.32 Kg (208 L) of toluene was introduced into a 500 L reactor with a mechanical stirrer under nitrogen atmosphere and then was stirred at a velocity of 70 rpm.

10.66 Kg (12 L) of tetrahydrofuran, 9.4 Kg (11.6 L) of butanol, 180 g (240 ml) of ethanol, 560 g (60 ml) of silicon tetraethoxide($Si(OEt)_4$) and 1.18 Kg (1.2 L) of tributyl phosphate were introduced thereto. The temperature was raised to 105° C. and the reaction was carried out for 7 hours. Homogeneous solution obtained after reaction was cooled to a room temperature.

<2 step> Preparation of Solid Supporter

Said magnesium solution was transferred to a 500 L reactor maintained at a temperature of 13° C. The irritator was maintained at a velocity of 82 rpm. 4.8 Kg (3.24 L) of $SiCl_4$ was introduced thereto for 30 minutes.

Then, 4.22 Kg (2.44 L) of $TiCl_4$ was introduced thereto. The temperature was gradually raised to 60° C. over 1 hour to provide solid supporter. All the processes to produce solid supporter were conducted in a closed reactor of which inner pressure is 1.5 bar.

After the reaction was carried out at a temperature of 60° C. for 1 hour, supporter was transferred into a 300 L reactor in 1 minute by using nitrogen pressure in order to prepare catalyst.

<3 step> Preparation of Catalyst

After said solid supporter was precipitated, the liquid portion was eliminated. Then, the remained was washed 2 times with 52 Kg (60 L) of toluene to provide a suspension. Then, the suspension was precipitated. Then, the liquid portion was eliminated from the suspension.

31.9 Kg (36.8 L) of toluene and 60 Kg (34.8 L) of $TiCl^4$ were introduced into a reactor maintained at a temperature of 15° C. and equipped with irritator of 60 rpm.

Then, the reactor temperature was raised to 110° C. and the solution was stirred at this temperature for 1 hour and followed by precipitation of solid supporter. The liquid portion was eliminated out from the suspension.

52 Kg (60 L) of toluene and 34.52 Kg (20 L) of $TiCl_4$ were fed into the reactor. Then, 1.447 Kg (1.392 L) of diisobutylphthalate was fed thereto at a temperature of 88° C.

The temperature of reactor was raised to 120° C. and then the suspension was stirred at this temperature for 1 hour. The liquid portion was eliminated out from the suspension. 31.9 Kg (36.8 L) of toluene was fed into the reactor. Then, the reactor is cooled to a temperature of 90° C., was stirred for 30 minutes.

After the completion of irritation, the liquid portion was eliminated out from the solution. 60 Kg (34.8 L) of $TiCl_4$ was introduced to the reactor, followed by the irritation at a temperature of 88° C. for 30 minutes.

All the processes to produce catalyst except introduction and elimination of reactant were conducted in a closed reactor of which inner pressure was 1.5 bar.

The catalyst prepared in this manner was washed 7 times with 40 L of purified hexane until no free titanium compound was detected in the wash liquid. The solid was then dried under nitrogen atmosphere to afford a catalyst.

Particle size distributions of supporters and those of catalysts were measured by using laser particle analyzer (Mastersizer X, Malvern Instruments).

The compositions of supporters and those of catalysts were analyzed by using ICP (inductively coupled plasma). Surface areas were analyzed by using BET.

Catalyst yield (%) is defined as the ratio of the weight of final product to the weight of $MgCl_2$ introduced initially. The results are shown in Table 1.

EXAMPLE 2

Example 1 was repeated except that inner pressure of reactor was changed to 0.01 bar.

The results are shown in Table 1.

EXAMPLE 3

Example 1 was repeated except that inner pressure of reactor was changed to 0 bar by setting the vent line of reactor open.

The results are shown in Table 1.

EXAMPLE 4

Example 1 was repeated except that a size-controlling agent, that is, $Si(OEt)_4$ was introduced at an amount of 300 g (600 ml). The results are shown in Table 1.

EXAMPLE 5

Example 1 was repeated except that inner pressure of reactor was changed to 0.20 bar and a size-controlling agent, that is, $Si(OEt)_4$ was introduced at an amount of 300 g (600 ml).

The results are shown in Table 1.

EXAMPLE 6

Example 1 was repeated except that inner pressure of reactor was changed to 0.01 bar and a size-controlling agent, that is, $Si(OEt)_4$ was introduced at an amount of 300 g (600 ml).

The results are shown in Table 1.

EXAMPLE 7

Example 1 was repeated except that inner pressure of reactor was changed to 0 bar by setting the vent line of reactor open and a size-controlling agent, that is, $Si(OEt)_4$ was introduced at an amount of 300 g (600 ml).

The results are shown in Table 1.

TABLE 1

| | (properties of catalysts prepared) | | | | | | | | |
|---|---|---|---|---|---|---|---|---|---|
| Example | Silicon tetraethoxide (g) | Presure (atm) | Catalyst yield (%) | Particle size (μm) | Ti (wt %) | Mg (wt %) | Al (ppm) | Si (ppm) | Surface area (m²/g) |
| 1 | 560 | 1.50 | 30 | 50 | 3.1 | 18.8 | 250 | 230 | 241 |
| 2 | 560 | 0.01 | 100 | 60 | 3.1 | 18.2 | 380 | 261 | 261 |
| 3 | 560 | 0 | 100 | 90 | 3.6 | 17.2 | 400 | 482 | 266 |
| 4 | 300 | 1.50 | 30 | 30 | 2.8 | 19.2 | 250 | 100 | 275 |
| 5 | 300 | 0.20 | 80 | 40 | 2.9 | 19.9 | 265 | 85 | 222 |
| 6 | 300 | 0.01 | 90 | 50 | 3.4 | 18.0 | 380 | 112 | 254 |
| 7 | 300 | 0 | 100 | 60 | 3.2 | 20.0 | 330 | 140 | 240 |

EXAMPLE 8

By using the catalyst prepared according to Example 1 of the present invention, prepolymerization was conducted, followed by polymerization.

Prepolymerization 300 ml of hexane and 6 mmol of AlEt$_3$ were transferred to 4 g of catalyst in glass bottle. This catalyst slurry was fed into a 1L glass reactor and kept at a temperature of 15° C. and a pressure of 0.5 bar or less.

While propylene being introduced at a velocity of 100 cc/minutes, said catalyst slurry was stirred at a velocity of 200 rpm for 100 minutes to provide prepolymer.

The degree of prepolymerization of prepolymer made in this manner was 3 g propylene (PP)/g catalyst (Cat.).

Polymerization

A 2 L reactor for high pressure was dried in oven and assembled hot. A glass vial containing 27 mg of catalyst prepared in said prepolymerization step was put into said reactor.

By repeating purging with nitrogen and evacuating to vacuum 3 times, the reactor was filled with nitrogen gas.

1000 ml of n-hexane was fed into the reactor, and then, triethyl aluminum(Al/Ti molar ratio=450) and cyclohexyl methyl dimethoxy silane(Si/Al molar ratio=0.1), that is, an exterior electron donor was put thereto.

With propylene pressure set to 20 psi, said glass vial was broken by a stirrer, and the mixture was stirred at a velocity of 630 rpm at a room temperature for 5 minutes to provide polymer.

100 ml of hydrogen was added thereto and the mixture was heated to 70° C. and pressurized to 100 psi with propylene.

After the mixture was stirred for 1 hour, the mixture was cooled, followed by addition of excess ethanol solution thereto.

Polymer produced was collected, and then, dried in a vacuum oven at 50° C. for at least 6 hours, yielding white powdery polypropylene.

Activity, bulk density, melt index (MI), decane solubility and so on of polymer produced were measured by using NMR, GPC and DSC.

The results are shown in Table 2.

EXAMPLE 9

Example 8 was repeated except that the catalyst of example 2 was used.

The results are shown in Table 2.

EXAMPLE 10

Example 8 was repeated except that the catalyst of example 3 was used.

The results are shown in Table 2.

EXAMPLE 11

Example 8 was repeated except that the catalyst of example 4 was used.

The results are shown in Table 2.

EXAMPLE 12

Example 8 was repeated except that the catalyst of example 5 was used.

The results are shown in Table 2.

EXAMPLE 13

Example 8 was repeated except that the catalyst of example 6 was used.

The results are shown in Table 2.

EXAMPLE 14

Example 8 was repeated except that the catalyst of example 7 was used.

The results are shown in Table 2.

TABLE 2

(properties of polymers prepared by using diverse catalysts)

| Example | The degree of pre-polymer-ization | activity | B/D | MI | II | Tm | Hm | D/S |
|---|---|---|---|---|---|---|---|---|
| 8 | 3 | 12.9 | 0.37 | 18.5 | 92 | 160.4 | 107.1 | 2.4 |
| 9 | 3 | 13.8 | 0.39 | 12.7 | 92 | 160.7 | 106.0 | 2.9 |
| 10 | 3 | 11.0 | 0.37 | 21.2 | 91 | 161.3 | 106.5 | 3.2 |
| 11 | 3 | 12.6 | 0.37 | 12.7 | 91 | 161.3 | 104.3 | 2.2 |
| 12 | 3 | 13.8 | 0.37 | 17.7 | 93 | 161.9 | 104.2 | 2.3 |
| 13 | 3 | 14.9 | 0.37 | 19.5 | 92 | 162.1 | 107.2 | 2.5 |
| 14 | 3 | 13.8 | 0.37 | 17.2 | 91 | 161.9 | 106.5 | 2.7 |

Wherein the units are as follows:

The degree of prepolymerization: g-PP/g-Cat;

B/D(Bulk Density): g/cc;

MI(Melt Index): g/10 min;

II(Isotactic Index): % (the measured value of NMR);

Tm(Melting Temperature: ° C.;

Hm(Heat of Melting): J/g; and

D/S(Decane Solubility): %.

Industrial Applicability

As apparent from the above examples, a polymer obtained by employing the solid catalyst produced according to the present invention has more improved stereoregularity. The solid catalyst produced according to the present invention has narrow distribution of particle size. In the preparation method according to the present invention, particle size can be so easily regulated that is advantageous to α-olefin copolymerization. By using the preparation method according to the present invention, catalyst having improved activity can be produced in high yield.

What is claimed is:

1. A method of preparing a titanium catalyst for olefin polymerization, said method comprising
    (1) preparing a magnesium compound solution by dissolving a magnesium halide having no reducing ability and a group IIIA element compound in a solvent mixture comprising the following: (a) a cyclic ether, (b) an alcohol, (c) a phosphorus compound, and (d) an organosilane;
    (2) contacting said magnesium compound solution with a reactant selected from the group consisting of a titanium compound, a silicon compound, or a tin compound, or a mixture thereof, and reacting said magnesium compound solution with said reactant, or mixture thereof, to produce a supporter; and
    (3) reacting said supporter with a titanium compound and an electron donor to produce a solid complex titanium catalyst having a particle size, wherein said particle size is regulated by controlling the solubility of said reactant of step (2) and/or said titanium compound and electron donor of step (3).

2. The method of claim 1, wherein said solubility of said reactant of step (2) and/or said titanium compound and electron donor of step (3) is controlled by adjusting an inner pressure of a reactor used for said reacting of steps (2) and/or (3).

3. The method of claim 1, wherein said contacting of step (2) is conducted at a temperature of −70° C. to 70° C.; said reacting of step (2) is conducted at a temperature of 50° C. to 150° C. and an inner pressure of 0 bar to 2 bar; said reacting of step (3) is conducted at a temperature of 90° C. to 120° C. and an inner pressure of 0 bar to 2 bar; and wherein said titanium catalyst produced in step (3) has a mean particle size of 30 μm to 120 μm.

4. The method of claim 1, wherein said group IIIA element compound of step (1) is an aluminum halide that is used in an amount of 0.25 mole or less per 1 mole of said magnesium halide.

5. The method of claim 1, wherein said cyclic ether of step (1) is selected from the group consisting of tetrahydrofuran, 2-methyl tetrahydrofuran, and tetrahydropyran, and said alcohol is selected from the group consisting of methanol, ethanol, propanol, butanol, pentanol, hexanol, octanol, decanol, dodecanol, octadecylalcohol, benzylalcohol, phenylethylalcohol, isopropylbenzylalcohol, and cumylalcohol.

6. The method of claim 1, wherein the total sum of said alcohol and said cyclic ether in step (1) is 0.5 mole to 20 moles per 1 mole of said magnesium halide and said alcohol is used in an amount of 0.05 mole to 0.95 mole per 1 mole of said cyclic ether.

7. The method of claim 1, wherein said alcohol in step (1) is a mixture of a $C_{1-3}$ alcohol at 1 mole percent to 40 mole percent and a $C_{4-20}$ alcohol at 60 mole percent to 99 mole percent.

8. The method of claim 1, wherein said phosphorus compound in step (1) is represented by the following Formula (1):

$$PX_aR_b^1(OR^2)_c \text{ or } POX_dR_e^3(OR^4)_f \qquad (1),$$

wherein X is a halogen atom;

each of $R^1$, $R^2$, $R^3$, and $R^4$ is, independently, $C_{1-20}$ alkyl, alkenyl, or aryl;

each of a, b, and c is, independently, an integer of 0 to 3, provided that a+b+c=3; and each of d, e, and f is, independently, an integer of 0 to 3, provided that d+e+f=3.

9. The method of claim 1, wherein said organosilane in step (1) is represented by the following Formula (2):

$$R_nSiR'_{4-n} \qquad (2),$$

wherein R is a hydrogen atom, $C_{1-10}$ alkyl, alkoxy, haloalkyl, or aryl, or $C_{1-8}$ halosilylalkyl group;

R' is halo, $C_{1-10}$ alkoxy, haloalkoxy, or aryloxy, or $C_{1-8}$ halosilylalkoxy; and n is an integer of 0 to 4.

10. The method of claim 1, wherein each of said phosphorus compound and said organosilane in step (1) is independently used in an amount of 0.01 mole to 0.25 mole per 1 mole of said magnesium halide.

11. The method of claim 1, wherein said magnesium halide in step (1) is reacted with said solvent mixture at a temperature of −25° C. to 200° C. for 1 hour to 20 hours.

12. The method of claim 1, wherein said titanium compound in step (2) is at least one selected from the group consisting of tetrahalogenated titanium, dihalogenated alkoxytitanium, and tetraalkoxytitanium; said silicon compound is at least one selected from the group consisting of silicon tetrahalide and silicon alkylhalide; and said tin compound is at least one selected from the group consisting of tin tetrahalide, tin alkylhalide, and tin hydrohalide.

13. The method of claim 1, wherein said titanium compound, said silicon compound, or said tin compound, or mixture thereof, in step (2) is used in an amount of 0.1 mole to 200 moles per 1 mole of said magnesium compound solution.

* * * * *

UNITED STATES PATENT AND TRADEMARK OFFICE
CERTIFICATE OF CORRECTION

PATENT NO. : 6,784,133 B2
DATED : August 31, 2004
INVENTOR(S) : Il Seop Kim, Moon Young Shin and Ki Su Ro It is certified that error appears in the above-identified patent and that said Letters Patent is hereby corrected as shown below:

Title page,
Item [57], ABSTRACT,
Line 13, replace "distribution f said" with -- distribution of said --.

Column 3,
Line 64, replace "in-an" with -- in an --.

Column 4,
Line 55, replace "C1-8" with -- $C_{1-8}$ --.

Column 6,
Line 66, replace "(60 ml)" with -- (600 ml) --.

Column 8,
Line 25, "The results are shown in Table 1." should begin on the next line.

Column 11,
Line 36, replace "$PX_aR_b^1 (OR^2)_a$" with -- $PX_aR_b^1 (OR^2)_c$ --.

Column 12,
Line 5, "each of d, e, and f is," should begin on the next line.

Signed and Sealed this

Twelfth Day of April, 2005

JON W. DUDAS
*Director of the United States Patent and Trademark Office*